US008283611B2

(12) United States Patent
Choi

(10) Patent No.: US 8,283,611 B2
(45) Date of Patent: Oct. 9, 2012

(54) DOOR HINGE FOR A HOUSEHOLD APPLIANCE

(75) Inventor: Hon Man Choi, Hong Kong (HK)

(73) Assignee: Hon Way Plastic & Metal Mfg. Co. Ltd., San Po Kong, Kowloon (HK)

( * ) Notice: Subject to any disclaimer, the term of this patent is extended or adjusted under 35 U.S.C. 154(b) by 517 days.

(21) Appl. No.: 12/603,691

(22) Filed: Oct. 22, 2009

(65) Prior Publication Data

US 2011/0095014 A1 Apr. 28, 2011

(51) Int. Cl.
*A21B 1/00* (2006.01)
*E05F 1/08* (2006.01)
*E05D 11/10* (2006.01)

(52) U.S. Cl. .............. 219/524; 16/286; 16/297; 16/333; 16/343; 16/374

(58) Field of Classification Search .................. 219/524; 16/286, 297, 333, 343, 374
See application file for complete search history.

(56) References Cited

U.S. PATENT DOCUMENTS

| | | | | |
|---|---|---|---|---|
| 3,153,259 | A * | 10/1964 | Brissette et al. | 16/333 |
| 3,749,080 | A * | 7/1973 | Kleinhenn | 126/191 |
| 4,817,240 | A * | 4/1989 | Sovis et al. | 16/297 |
| 5,058,240 | A * | 10/1991 | Barda et al. | 16/325 |
| 6,052,870 | A * | 4/2000 | Hagenlocher et al. | 16/347 |
| 7,721,388 | B2 * | 5/2010 | Lee | 16/286 |
| 2006/0200947 | A1 * | 9/2006 | Ham | 16/374 |
| 2010/0229344 | A1 * | 9/2010 | Donoho | 16/333 |
| 2011/0061202 | A1 * | 3/2011 | Yip | 16/374 |

* cited by examiner

*Primary Examiner* — Alexander Ghyka
(74) *Attorney, Agent, or Firm* — Leydig, Voit & Mayer, Ltd.

(57) ABSTRACT

A compact, low-cost hinge assembly for mounting a door to a household appliance. A stay bar has first and second elongate edge surfaces extending between opposing first and second ends. The first end is pivotally connected to a door-mounting bracket on which an abutment is located. A torsion spring is mounted to a body-mounting bracket, and an arm of the spring resiliently engages the first edge surface to urge the second surface into engagement with the abutment, urging the door, in a closed position, toward the closed position. A detent recess in the second surface receives the abutment to hold the door partially open. A stop face projects from the first edge surface, and the spring arm contacts the stop face to hold the door horizontal, in a fully open position.

11 Claims, 4 Drawing Sheets

DOOR HINGE FOR A HOUSEHOLD APPLIANCE

TECHNICAL FIELD

The present invention relates to a hinge for a household appliance, for instance a toaster oven, a dishwasher or the like, whereby the door is pivotable about a horizontal axis from an upright closed position into a horizontal open position.

BACKGROUND OF THE INVENTION

For use in horizontally pivoted oven doors, hinges typically include a counterweight or recoil spring arrangement for supporting the weight of the door when opening, for instance in an equilibrium position, shortly before reaching the closing position of the door, and afterwards for holding the door closed. These arrangements avoid as far as possible large forces that would otherwise result from uncontrolled opening of the door.

Bench top toaster ovens are well suited for toasting and reheating tasks, but can also be used for baking and grilling. Being small in size such ovens are portable and can be accommodated in any kitchen, while also offering ease of use and cleaning. In toaster ovens there remains a need for a hinge which improves the course of motion when opening or closing a door, in particular within the end position ranges. However, the relatively complex hinge arrangements used on conventional ovens cannot be justified because the doors of toaster ovens are relatively lighter, and because they must achieve a substantially lower manufactured cost. In many toaster ovens a pair of tension-type coil springs is used to bias the door closed, and each spring, mounted as it is in the housing at either side of the door, requires significant space which compromises the ability to provide a more compact oven. It is an object of the present invention address the above need or more generally to provide an improved hinge for a horizontally pivoted door on a household appliance.

DISCLOSURE OF THE INVENTION

According to one aspect of the present invention there is provided a hinge assembly for mounting a door to the body of a household appliance, including:

a door-mounting bracket for mounting to the door;

a hinge pin for pivoting the door about a horizontal axis between a substantially upright closed position, a first open position near the closed position and a second open position;

a body-mounting bracket for mounting to the body;

an abutment on the body-mounting bracket;

a stay bar having first and second elongate surfaces extending between opposing first and second ends thereof, the first end being pivotally connected to the door-mounting bracket, at least one detent recess in the second surface proximate the first end, a stop face projecting from the first surface proximate the second end, and a spring mounted to the body-mounting bracket, the spring having an arm slidingly and resiliently engaging the first surface to apply a torque to the stay bar to urge the second surface into engagement with the abutment, whereby the arm cooperates with the abutment to urge the door closed in its closed position, the abutment is received in the at least one detent recess to hold the door in its first open position and the arm contacts the stop face to support the door in its second open position.

Preferably the body-mounting bracket is formed of sheet metal and the abutment comprises a rivet fastened to the body-mounting bracket. Alternatively, the abutment may be integral with the body-mounting bracket.

Preferably the second end of the stay bar is hook-shaped and the stop face is formed on the hooked part.

Preferably the spring comprises a torsion spring having a helical section receiving a fastener by which the spring is mounted to the body-mounting bracket.

Preferably a crook portion is provided on the end of the arm and the first surface is slidingly received in the crook portion.

Preferably the second surface further includes a concavity adjacent the detent recess, the abutment being received in the concavity when the door is in its closed position.

This invention provides a compact, space-efficient hinge assembly which is effective and efficient in operational use, and which has an overall simple design which minimizes manufacturing costs making it particularly suited to application in products such as toaster ovens.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
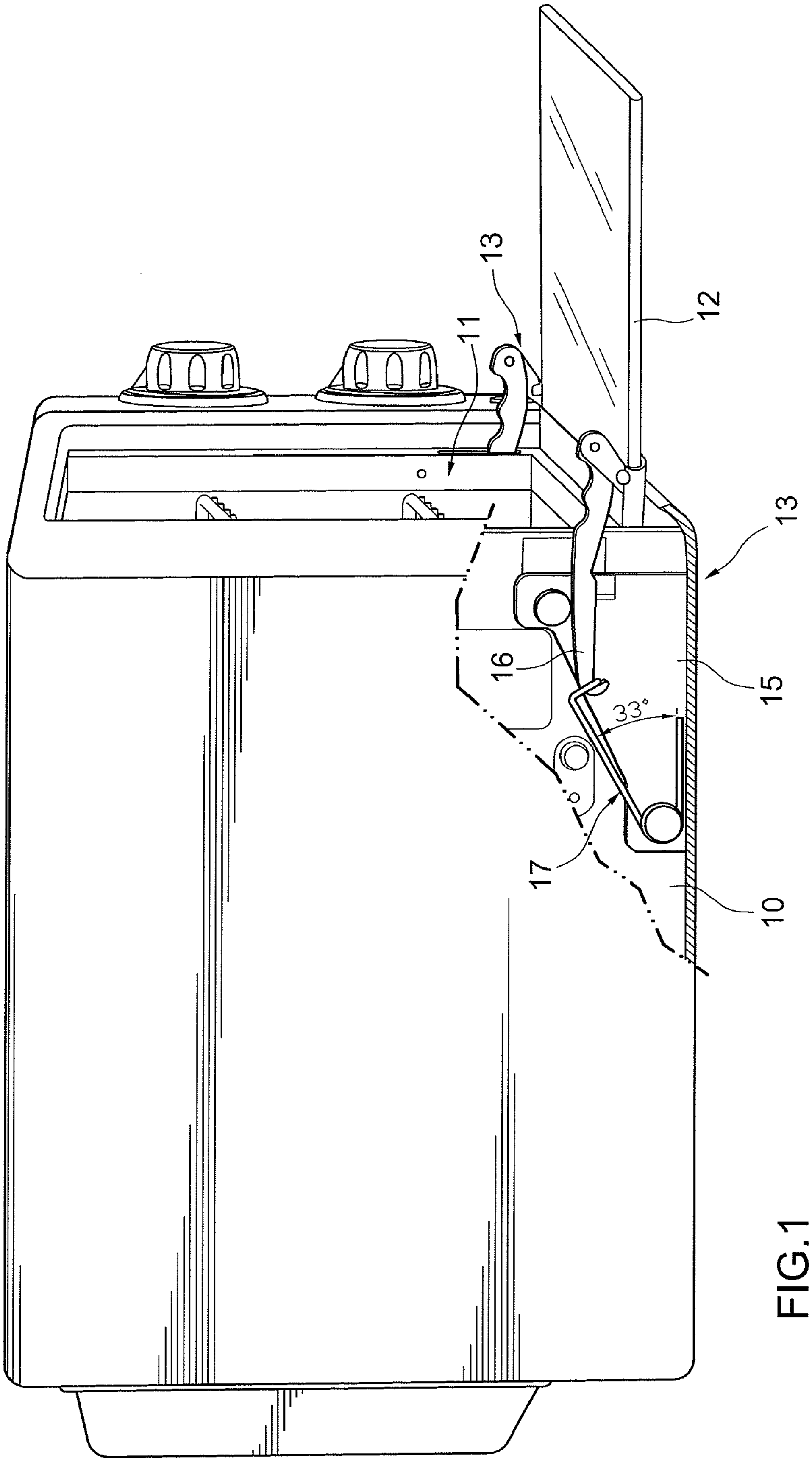
FIG. 1 is a perspective view of a toaster oven having a hinge assembly according to the invention.
Figure 2:
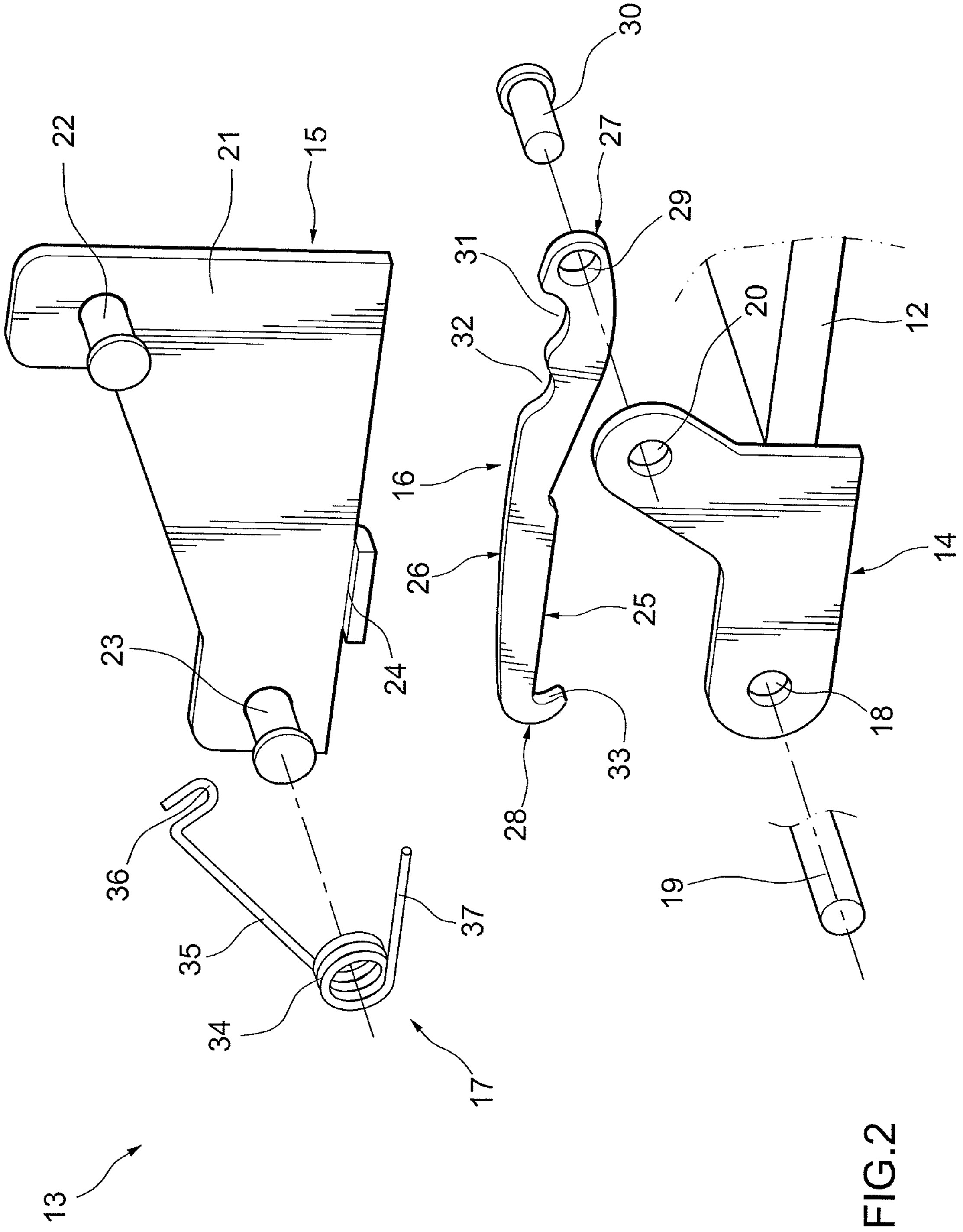
FIG. 2 is an exploded view of the hinge assembly of FIG. 1.

Referring to the drawings, a toaster oven has a body 10 of a generally rectangular prismatic shape with a front opening 11 closed by a door 12. The door 12 is mounted by a pair of hinge assemblies 13 fixed to the lower part of the body 10 on either side of the opening 11 providing a horizontal pivot axis allowing the door to swing upwardly from its horizontal open position (shown in FIG. 1), to an upright closed position.

Each hinge assembly 13 includes a door-mounting bracket 14, body-mounting bracket 15, a stay bar 16 and a torsion spring 17.

The door-mounting bracket 14 is mounted as by fasteners (not shown) near a corner of the door 12 and includes an aperture 18 for receiving a horizontal hinge pin 19. The hinge pin 19 engages a hinge part (not shown) fixed to the body 10, the hinge part, door-mounting bracket 14 and hinge pin 19 hingedly mounting the door 12. The door-mounting bracket 14 further includes a circular opening 20 offset inwardly of the plane of the door.

The body-mounting bracket 15 has a sheet metal portion 21 fastened against the upright wall forming the side of the body 10. Optionally, the bracket 15 may be integral with the side wall of the body. An abutment 22 is fastened to the body-mounting bracket 15. A fastener 23, is fixed to the body-mounting bracket 15, offset below and rearwardly of the abutment 22. In the embodiment illustrated, both the abutment 22 and fastener 23 are provided by like rivets extending outwardly from the portion 21, each having an outermost enlarged head. An integral tab 24 projects from a lower edge of the portion 21. Body-mounting brackets 15 for mounting on opposing sides of the body are mirror images of one another.

The stay bar 16 has a first elongate edge 25 opposite a second elongate edge 26, both edges 25, 26 extending between longitudinally opposing first and second ends 27 and 28. The first end 27 has an aperture 29 and a pin 30 through the apertures 20, 29 pivotally connects the stay bar 16 to the door-mounting bracket 14. Formed in the second edge 26 proximate the first end 27 is a concavity 31, longitudinally spaced from which is a detent recess 31. The concavity 31 and detent recess 31 form a continuous curve in the second edge 26. The second end 28 of the stay bar is hook-shaped and a stop face 33 is formed on the hooked part, projecting from the first edge 25. Near the middle of the first elongate edge 25 is a notch 40, spaced apart from the stop face 33 by a preferably linear section of the edge 25.

The torsion spring 17 has a helical section 34 receiving the fastener 23 by which it is connected to the body-mounting bracket 15. The spring 17 has an arm 35 with upwardly opening crook portion 36 on its end in which the first edge 25 is received. A leg 37 of the spring 17, at the opposing end to the arm 35, abuts the tab 24.

Figure 3A:
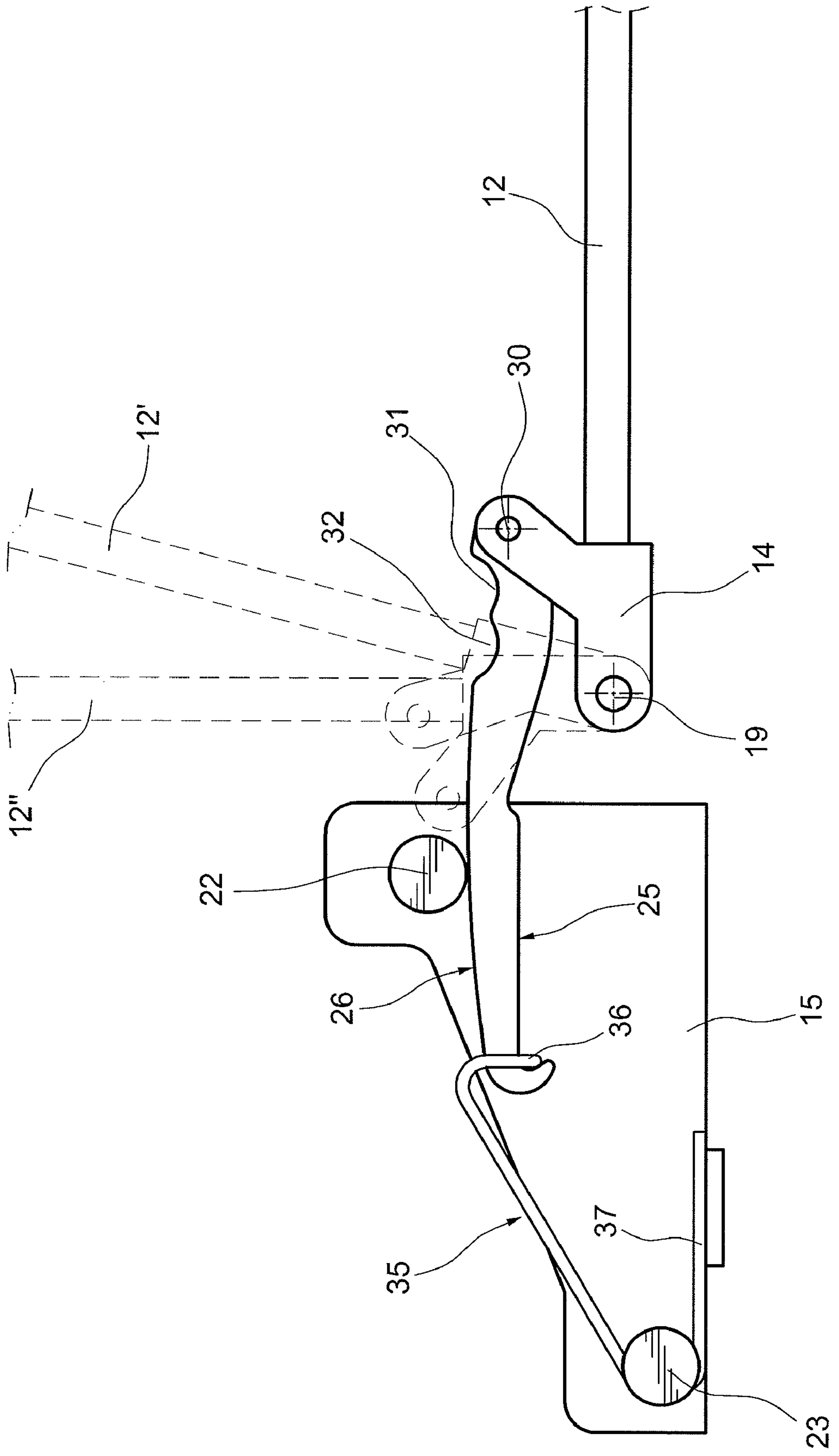
FIG. 3*a* is a side view of the hinge assembly of FIG. 1 with the door in a first open position.
Figure 3B:
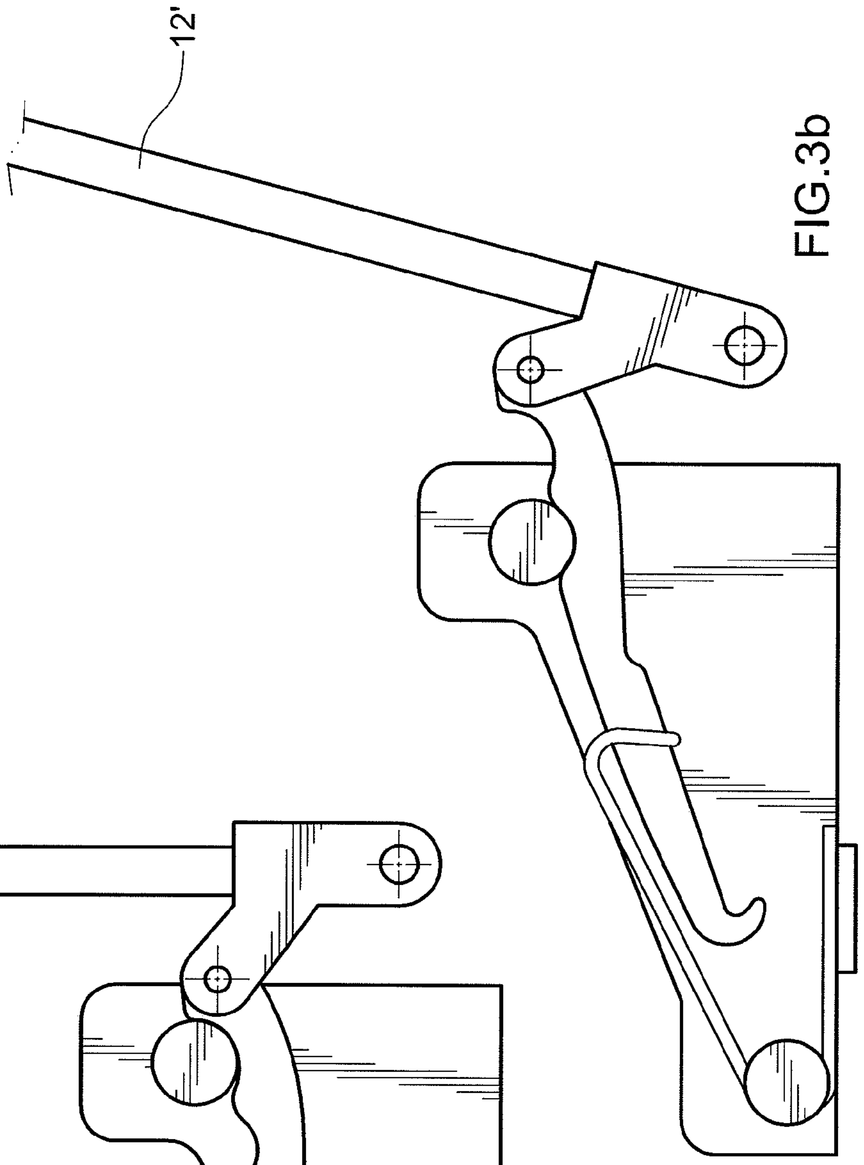
FIGS. 3*b* and 3*c* show views corresponding to FIG. 3*a*, with the door in a second opened position and a closed position respectively.
Figure 3C:
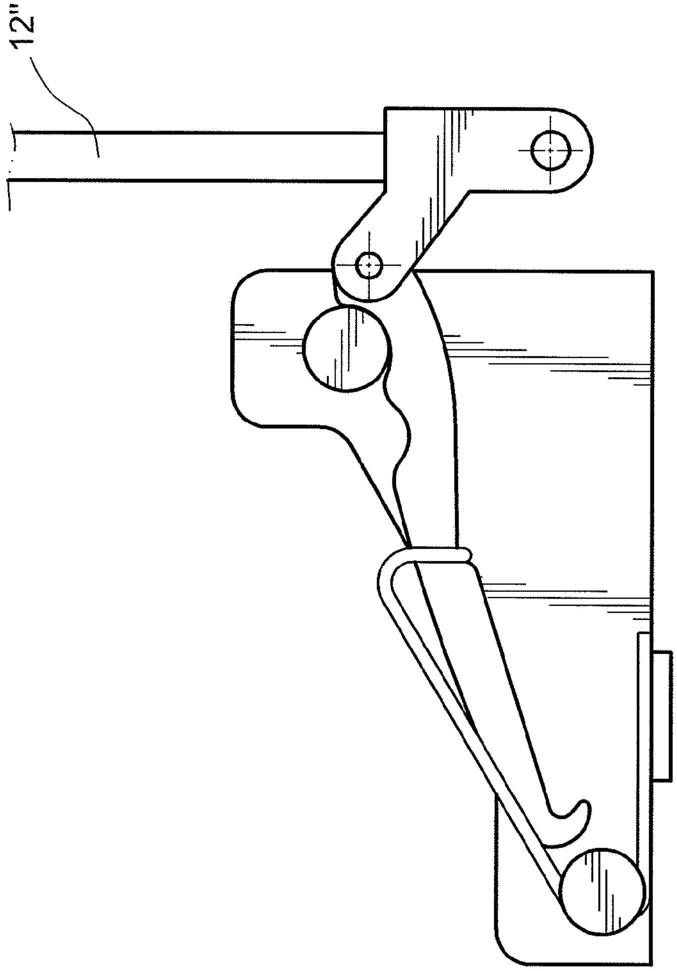

In use, with the door in the open position the hinge serves to support the weight of the door, resiliently supporting it in a generally horizontal alignment. The arm 35 resiliently engages the first edge 25 to apply a torque to the stay bar 16, urging the second edge 26 into engagement with the abutment 22. In the illustrated open position, the arm 35, specifically its crook portion 36, contacts the stop face 33 to hold the door in position. When the weight of the door is supported in this manner by the hinge, the load applied by the weight of the door 12 superimposes a tensile stress upon the bending stress predominating in the arm 35 up until that point. In this open position, abutment 22 becomes separated from the second edge 26. As the door 12 is rotated from this generally horizontal first open position toward its upright closed position, the abutment 22 and second edge 26 make contact and then maintain sliding contact, due to the torque applied by the spring 17. When the door 12 is rotated to a second open position 12' about 15 degrees away from its closed position (as shown in FIG. 3*b* and in phantom outline in FIG. 3*a*) the abutment 22 is received in the detent recess 32, thereby serving to hold the door partly open. Further rotation to the closed position 12" (as shown in FIG. 3*c* and in phantom outline in FIG. 3*a*) moves the abutment 22 out of the detent recess 32 into the concavity 31. In this position, the lever action multiplies the spring torque to hold the door closed, and the crook portion 36 is received in the notch 40.

Aspects of the present invention have been described by way of example only and it should be appreciated that modifications and additions may be made thereto without departing from the scope thereof.

The invention claimed is:

1. A hinge assembly for mounting a door to the body of a household appliance, comprising:

a door-mounting bracket for mounting to the door;

a hinge pin for pivoting the door about an axis between a closed position, a first open position near the closed position, and a second open position;

a body-mounting bracket for mounting to the body;

an abutment on the body-mounting bracket;

a stay bar having first and second elongate surfaces extending between opposing first and second ends of the stay bar, the first end being pivotally connected to the door-mounting bracket, at least one detent recess in the second surface proximate the first end, and a stop face projecting from the first surface proximate the second end; and a spring mounted to the body-mounting bracket, the spring having an arm slidingly and resiliently engaging the first surface to apply a torque to the stay bar to urge the second surface into engagement with the abutment, wherein the arm cooperates with the abutment to urge the door, in the closed position, toward the closed position the abutment is received in the at least one detent recess to hold the door in the first open position, and the arm contacts the stop face to support the door in the second open position.

2. The hinge assembly of claim 1 wherein the second end of the stay bar is hook-shaped and the stop face is located on the hooked part.

3. The hinge assembly of claim 1 including a fastener wherein the spring comprises a torsion spring having a helical section receiving the fastener and the spring is mounted to the body-mounting bracket by the fastener.

4. The hinge assembly of claim 1 wherein the arm includes a crook portion on an end of the arm and the first surface is slidingly received in the crook portion.

5. The hinge assembly of claim 1 wherein the second surface further includes a concavity adjacent the detent recess, the abutment being received in the concavity when the door is in the closed position.

6. The hinge assembly of claim 1 wherein the body-mounting bracket is sheet metal and the abutment comprises a rivet fastened to the body-mounting bracket.

7. The hinge assembly of claim 1 comprising a fastener, wherein the first and second surfaces comprise edges of the stay bar, the stop face is located on a hooked part of the stay bar, and the spring comprises a torsion spring having a helical section receiving the fastener and the spring is mounted to the body-mounting bracket by the fastener.

8. The hinge assembly of claim 7 wherein the arm includes a crook portion on an end of the arm, the first surface is slidingly received in the crook portion, the second surface further includes a concavity adjacent the detent recess, and the abutment is received in the concavity when the door is in the closed position.

9. The hinge assembly of claim 8 wherein the first surface further includes a notch, and the crook portion is received in the notch when the door is in the closed position.

10. A toaster oven having the hinge assembly of claim 1.

11. The hinge assembly of claim 1 wherein the axis is substantially horizontal and the door, in the closed position, is substantially vertical.

* * * * *